E. SCHMIDT.
ARRANGEMENT FOR MIXING EMULSIONS.
APPLICATION FILED FEB. 8, 1912.
1,062,554.
Patented May 20, 1913.
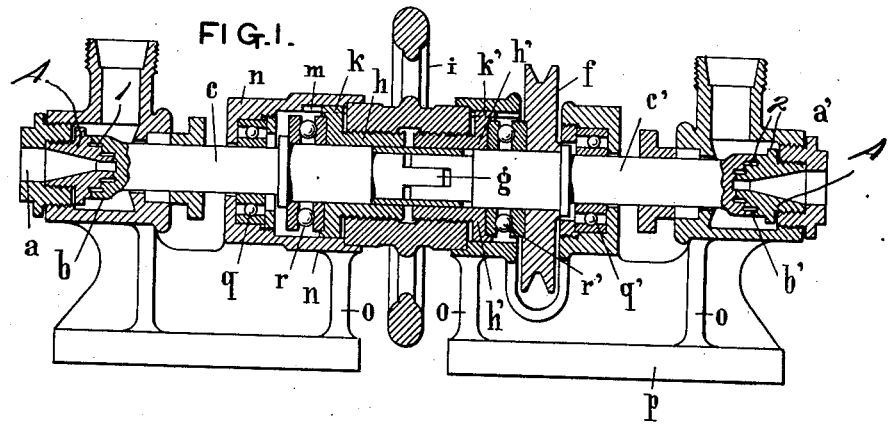
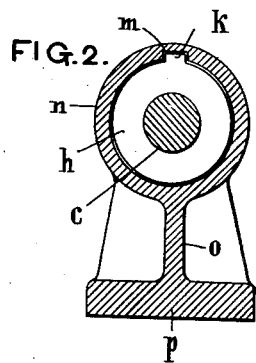
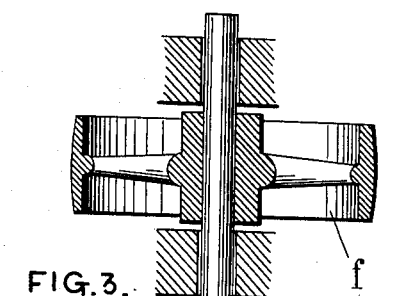
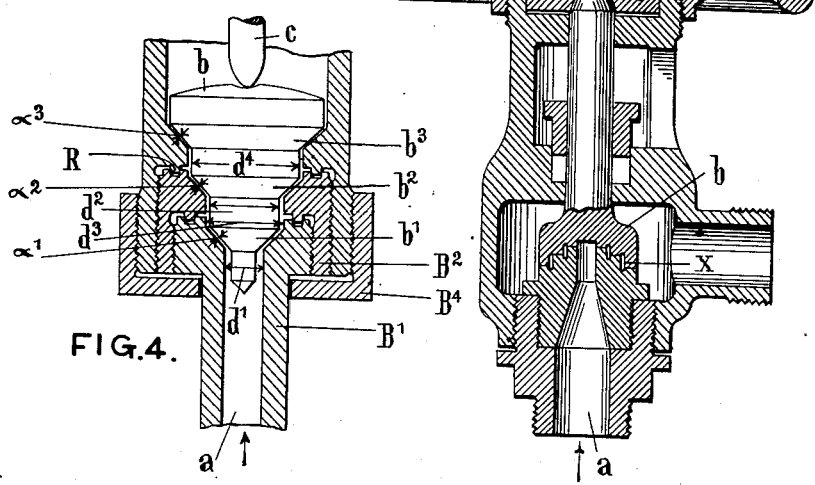
Witnesses
Inventor
Eduard Schmidt
his Attorneys

UNITED STATES PATENT OFFICE.

EDUARD SCHMIDT, OF LÜBECK, GERMANY, ASSIGNOR TO THE FIRM OF WILH. G. SCHRÖDER, OF LÜBECK, GERMANY.

ARRANGEMENT FOR MIXING EMULSIONS.

1,062,554.  Specification of Letters Patent.  Patented May 20, 1913.

Application filed February 8, 1912. Serial No. 676,361.

*To all whom it may concern:*

Be it known that I, EDUARD SCHMIDT, engineer, a citizen of the free town of Lübeck, in the Empire of Germany, and resident of Lübeck, Germany, have invented a new and useful Arrangement for Mixing Emulsions, of which the following is a specification.

The present invention relates to an arrangement for mixing emulsions, in which the thrust exerted by the operation from opposite sides on the spindle is compensated. In arrangements of the kind hitherto used it would sometimes occur, that the thrust became so great on one side, that the whole spindle was longitudinally displaced and the passage completely cut off on the other side. Under these circumstances then the emulsioning surface would run idle and heat.

According to the present invention the operating spindle is composed of two sections. It is thereby avoided that the whole spindle can be displaced, but the two said sections can be axially displaced in an axial direction to each other, so that the pressure of the revolving cone on its seat can be regulated in a very accurate manner, without the two working surfaces influencing each other.

In the accompanying drawing the new arrangement is exemplified.

Figure 1 is a longitudinal section, and Fig. 2 is a cross section through the new arrangement. Fig. 3 is another constructional form on an enlarged scale. Fig. 4 is a further modification of the working surfaces.

The liquid to be emulsioned enters the machine at $a$ and $a'$, in which machine the spindle carrying the stepped working surfaces $b$ and $b'$ is rotatably journaled. This spindle is of concave construction and is driven by means of the pulley $f$. The spindle consists of two sections $c$ and $c'$, which are coupled at $g$ in such a manner, that they must revolve simultaneously and coaxially, while, however, an axial relative displacement of the two sections is possible. For this purpose sleeves $h$, $h'$ are fitted on either of these sections respectively; these sleeves are provided on their outer surface with right hand and left hand threads respectively and are screwed therewith into the female thread in the hub of a handwheel $i$, so that on the said handwheel $i$ being turned in the one or the other direction the two spindle sections $c$ and $c'$ will be axially approached to each other or moved farther apart from each other respectively. For preventing the sleeves $h$, $h'$ from revolving they are engaged with lugs $k$, $k'$ in a groove $m$ of the stationary casing $n$ (Fig. 2). This casing is supported on suitable webs $o$ on the base plate $p$. The spindle is journaled in the casing $n$, by means of the ball-bearings $q$, $q'$. Other ball-bearings $r$, $r'$ are provided which will take up the high axial thrust exerted by the liquid on the spindle and transmit it from the spindle to the stationary sleeves $h$, $h'$.

The stepped faces $b$ and $b'$ coact with similarly stepped faces 1 and 2 on the heads 3 and 4 respectively, which are of convex construction.

In the constructional form illustrated in Fig. 3 cavities $x$ are provided between the stepped working surfaces $b$ of the spindle. In these cavities the milk or the like may be mixed over again. The solid particles which have merely been flattened between the first set of working surfaces are here mixed up, are then seized by the second step and now disintegrated.

In the constructional form shown in Fig. 4 the stepped working surfaces are disposed in such a manner that the gap $a^1$ between the first working surface $b'$ and its seat is slightly larger than the gap $a^2$ between the second working surface $b^2$ and its seat, and that this gap $a^2$ is again larger than the gap $a^3$ between the working surface $b^2$ and its seat. As the correct gaging of these gaps can be obtained with difficulty only and not for permanency, the present invention further provides arrangements which admit of an adjustment of the gaps $a^1$, $a^2$, $a^3$. This can only be obtained by the revolving body consisting of several relatively adjustable sections or, as shown in the drawing by the seats for the several working surfaces being adjustable. The seat of the working surface $b^3$ is arranged stationary in the casing, the seat for the working surface $b^2$ is, however, arranged in a sleeve $B^2$ which is threaded both on its inside and on its outside. The seat for the working surface $b'$ is arranged in a second sleeve $B'$ which is threaded on its outside and screws into the female thread of the sleeve $B^2$. These sleeves may be screwed into each other by means of suitable wrenches. On the casing may be further screwed a cap-nut, and the relatively displaceable parts are guided and jointed by means of annular tongues and grooves R.

I claim:

1. In an apparatus for mixing emulsions, the combination of a fixed and a revoluble member disposed in axial relation, one of said members being of convex construction and having a stepped acting face; the other of said members being of concave construction and having a stepped coacting face, said coacting faces adapted to work the material; and means for axially adjusting one of said members to vary the extent of space between said coacting faces, substantially as described.

2. In an apparatus for mixing emulsions, the combination of a fixed and a revoluble member disposed in axial relation, one of said members having a central opening for feeding the liquid, and being of convex construction and having a stepped acting face; the other of said members being of concave construction and having a stepped and coacting face, said coacting faces adapted to work the material; and means for axially adjusting one of said members to vary the extent of space between said coacting faces, substantially as described.

3. In an apparatus for mixing emulsions, the combination of a fixed member of convex construction and having a stepped acting face; a revoluble shaft having a complementary coacting working face; a pulley fixed on said revoluble shaft; a screw-threaded collar mounted to move axially on said shaft; a thrust bearing interposed between said collar and said pulley; and a hand-turning wheel having screw-threaded engagement with said collar and adapted to adjust the same for varying the degree of thrust on said revoluble shaft, substantially as described.

4. In an apparatus for mixing emulsions, the combination of oppositely disposed fixed members having stepped acting faces; a divided and revoluble shaft mounted coaxially with and intermediate said fixed members, said shaft having the respective ends thereof constructed with complementary stepped coacting faces; a pulley mounted on said shaft; a pair of collars axially movable on said shaft; thrust bearings interposed between the shaft sections and said collars; and a hand-turning wheel having screw-threaded connection with said collars and operable to move the same for varying the degree of thrust on said shaft sections, substantially as described.

5. In a homogenizer two coacting homogenizing elements having stepped squeezing surfaces, and means for admitting fluid between the surfaces.

6. In a homogenizer two homogenizing elements having stepped squeezing surfaces, means for admitting fluid centrally of the surfaces, and means permitting discharge of the fluid from the margins of the surfaces.

In testimony, that I claim the foregoing as my invention, I have signed my name in presence of two witnesses, this twenty sixth day of January 1912.

EDUARD SCHMIDT.

Witnesses:
 JOHN WULF,
 HEINR EHLERS.